Aug. 8, 1933.    M. W. SEYMOUR    1,921,545
COLORED SCREENING LAYER FOR SENSITIVE PHOTOGRAPHIC ELEMENTS
Filed Oct. 29, 1931
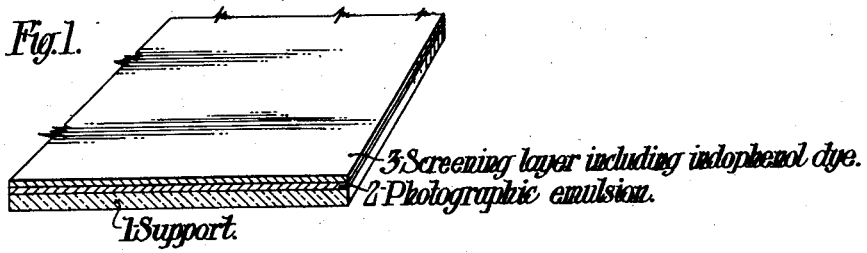
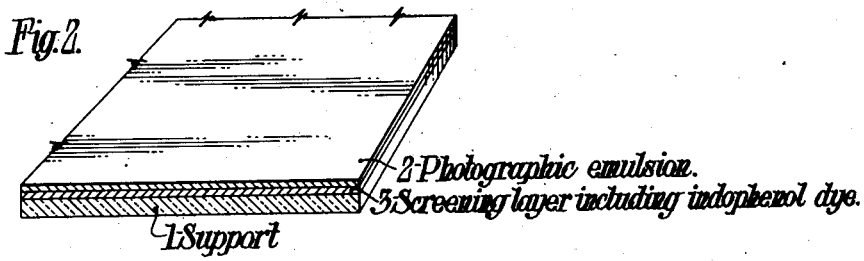
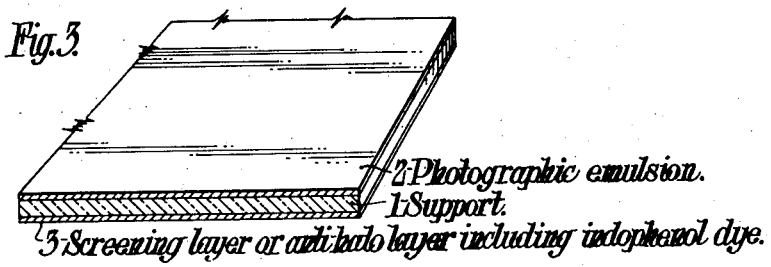
Inventor:
Merrill W. Seymour,
By
Attorney Patented Aug. 8, 1933

1,921,545

UNITED STATES PATENT OFFICE 1,921,545

COLORED SCREENING LAYER FOR SENSITIVE PHOTOGRAPHIC ELEMENTS

Merrill W. Seymour, Rochester, N. Y., assignor to Eastman Kodak Company, Rochester, N. Y., a Corporation of New York Application October 29, 1931. Serial No. 571,941

7 Claims. (Cl. 95—8)

This invention relates to a colored coating material for use as a screening layer with sensitive photographic elements. Such a layer may be useful in color photography as a top coating placed over the silver halide emulsion, constituting a filter layer, as a sub-coating or undercoating for the same purpose, or as either a filter layer or a non-halation backing on the rear face or support side of a photographic element.

Heretofore such coatings have usually been made of a gelatin solution containing a plain dye or combination of dyes, or of some other colloid containing a dye or dyes, or various solutions of dyes in solvents. For many purposes, especially where the dyes are applied in a top coating, such screening layers should be non-diffusing, that is, the dyes should not wander or bleed from one emulsion layer to another with which it is in contact.

I have discovered that colloidal suspensions of certain dyes, specifically the indo-phenols or certain dyes closely related to them, as disclosed later in this specification, are particularly useful for this purpose and have to a marked degree the desirable qualities required. These may be made, for example, by mixing a gelatin solution of a nitroso derivative of a tertiary aromatic amine with a gelatin solution of a suitable phenolic substance in which the position para to the hydroxy group is not substituted. The resulting insoluble indo-phenol is precipitated in colloidal form in the gelatin. As a definite example, a gelatin solution of p-nitroso dimethyl aniline is mixed with a gelatin solution of alpha-naphthol. An insoluble blue dye, an indo-phenol, is formed.

Alternatively, a gelatin solution containing a derivative of an aromatic diamine or amino phenol and a suitable phenolic substance may be oxidized with a stream of air. In place of phenolic substances, I may use compounds containing acid methylene groups, for example, 1-phenyl-3-methyl-5-pyrazolone. When such compounds are used, dyes related to the indophenols are produced.

Other colloids than gelatin may also be employed, as for example, gum arabic or starch. Gelatin is, however, preferable in most cases.

The following are some formulas for preparing colloidal solutions of the type of dyes described:

Example I

| | |
|---|---|
| p-Amino-diethyl-aniline hydrochloride | 2.0 grams |
| Water | 200.0 cc. |
| Thymol | 1.5 grams |
| Ethyl alcohol, 95% | 100.0 cc. |
| Gelatin, 12.5% solution | 100.0 cc. |
| Ammonia water, 28% | 3.0 cc. |

Air is drawn through this solution for several hours while the solution is kept warm. A deep blue color develops. The resulting solution is set to a jelly, shredded and washed in cold running water and reheated for coating. This coating material may then be used as a blue filter layer or as a non-halation layer.

Example II

Solution A

| | |
|---|---|
| p-Nitroso-diethyl-aniline | 0.005 mole or 0.9 gram |
| Ethyl alcohol, 95% | 60.0 cc. |
| Water | 60.0 cc. |
| Gelatin, 12.5% solution | 60.0 cc. |

Solution B

| | |
|---|---|
| Alpha naphthol | 0.005 mole or 0.75 gram |
| Ammonia water, 28% | 10.0 c. c. |
| Water | 120.0 c. c. |
| Gelatin, 12.5% solution | 60.0 c. c. |

Solution B is poured into Solution A and the mixture is heated to 120° F. It then turns to a deep blue color. The solution is set, shredded, washed, and re-melted, as for Example I.

A reddish-brown gel can be prepared by the use of 1-phenyl-3-methyl-5-pyrazolone and p-nitroso-diethyl-aniline. Other coatings of various colors are similarly made.

These dyes may all be easily removed from the films or plates by treating them with an alkaline solution of sodium hydro-sulphite. Most of them may also be bleached by treatment in an acid bath. It is, of course, desirable in nearly all cases that these dyes should be removed or bleached during or after the development, fixing, and washing or other chemical treatment to which the film is submitted. The type of coating I have described, therefore, meets this requirement.

Coatings made according to my invention are especially useful where it is important that the dye will not diffuse into another layer with which it is in contact, as, for example, in the case where two films are rolled together face to face and exposed together in the camera, one of the films having on its emulsion surface a screening dye layer which acts as a filter for the film behind it. For example, in a two-color process a green sensitive film and a red sensitive film are used with their emulsion surfaces practically in contact, the picture exposure being made through the support side of the green sensitive film.

The green sensitive emulsion is given a thin top coat of a green absorbing substance which prevents the green rays from affecting the red sensitive emulsion which has a certain sensitivity to green. This green absorbing substance must not diffuse into the green sensitive layer to any marked extent. It is for such a purpose that my invention is especially useful.

Non-diffusing color coatings of the type I have described may also be used advantageously as non-halation layers in which case they are coated on the support side of the film or plate. They will be particularly useful in the case of films where the film is wound tightly upon itself in spiral form, the backing of one convolution being in contact with the emulsion surface of another, sometimes for a long time. In such a case the diffusion of the dye from the non-halation coating into the adjacent emulsion layer will sometimes be detrimental.

Although it is believed that it is obvious how the present invention may be used in preparing photographic material, reference is made to the attached drawing, the three figures of which are similar perspective views of three different photographic sheets embodying my invention, the edges being much magnified to show the several layers.

The same reference characters are used in the several figures to indicate layers of identical or similar character. 1 designates a support, preferably transparent, such as cellulosic film or glass, 2 designates a layer of photographic emulsion, and 3 designates a screening or anti-halo layer comprising a colloidal suspension of an indophenol dye or related dye. In the drawing, Fig. 1 shows a screening layer coated over the photographic emulsion layer; Figure 2 shows the photographic emulsion layer coated over the screening layer, and Figure 3 shows the photographic emulsion layer and the screening or anti-halo layer coated on opposite sides of the support.

I consider as included within my invention, all modifications and equivalents coming within the scope of the appended claims.

What I claim as my invention and desire to be secured by Letters Patent of the United States is:

1. A non-diffusing colored coating material for use as a screening layer with sensitive photographic elements and comprising a protective colloidal medium and a colloidal suspension of an indophenol dye dispersed therein.

2. A non-diffusing colored coating material for use as a screening layer with sensitive photographic elements and comprising a protective colloidal medium and a colloidal suspension of an indophenol dye dispersed therein, said dye having the characteristics of being colored, non-diffusing and easily bleached by immersion in a suitable bath.

3. A photographic element comprising a support, a sensitive layer, and a screening layer comprising a protective colloid carrying in colloidal suspension a non-diffusing indophenol dye.

4. A photographic element comprising a support, a sensitive layer, and a screening layer comprising a colloid carrying in suspension an indophenol dye, the dye having the characteristics that it is colored, does not diffuse in gelatine, and is readily removable in a bleaching bath.

5. A photographic element comprising a support, a sensitive layer, and a screening layer comprising protective colloid carrying in colloidal suspension an indophenol dye, the dye having the characteristics that it is colored, does not diffuse in gelatine, and is readily removable in a bleaching bath, said screening layer being over the sensitive layer.

6. A photographic element comprising a support, a sensitive layer, and a screening layer comprising a colloidal suspension of an indo-phenol dye, the dye having the characteristics that it is colored, does not diffuse in gelatine, and is readily removable in a bleaching bath, said sensitive layer being over the screening layer.

7. A photographic element comprising a support, a sensitive layer, and a screening layer comprising a colloidal suspension of an indo-phenol dye, the dye having the characteristics that it is colored, does not diffuse in gelatine, and is readily removable in a bleaching bath, said sensitive layer and screening layers being on opposite surfaces of the support.

MERRILL W. SEYMOUR.